(12) United States Patent
Andreasson

(10) Patent No.: US 8,165,605 B2
(45) Date of Patent: Apr. 24, 2012

(54) AUTOMATIC DETECTION OF PERSONAL NETWORKS

(75) Inventor: Mans Folke Markus Andreasson, Lund (SE)

(73) Assignee: Sony Mobile Communications AB, Lund (SE)

( * ) Notice: Subject to any disclaimer, the term of this patent is extended or adjusted under 35 U.S.C. 154(b) by 787 days.

(21) Appl. No.: 12/261,395

(22) Filed: Oct. 30, 2008

(65) Prior Publication Data

US 2010/0112989 A1 May 6, 2010

(51) Int. Cl.
*H04W 64/00* (2009.01)
(52) U.S. Cl. .................. 455/456.3; 455/414.2; 455/458; 455/434
(58) Field of Classification Search ............. 455/414.1, 455/414.2, 414.3, 435.1, 434, 448, 456.1, 455/456.2, 456.3, 456.5, 461, 515, 68, 458; 340/994
See application file for complete search history.

(56) References Cited

U.S. PATENT DOCUMENTS

| 7,177,651 B1 * | 2/2007 | Almassy .................. 455/456.1 |
| 2002/0111173 A1 * | 8/2002 | Hendrey et al. ............... 455/456 |
| 2006/0116115 A1 * | 6/2006 | Lee .............................. 455/417 |

FOREIGN PATENT DOCUMENTS

| EP | 1 243 941 A1 | 9/2002 |
| WO | WO 01/97543 A1 | 12/2001 |
| WO | WO 2006/036206 A1 | 4/2006 |

* cited by examiner

*Primary Examiner* — John J Lee
(74) *Attorney, Agent, or Firm* — Snyder, Clark, Leach & Chung, LLP

(57) ABSTRACT

A method may include receiving information about a geographic position of each of a plurality of mobile terminals for a particular time. The method may further include determining a relationship between two of the mobile terminals based on the geographic position and the particular time and automatically suggesting, based on the relationship, an information exchange of contact information between the two mobile terminals.

17 Claims, 10 Drawing Sheets

AUTOMATIC DETECTION OF PERSONAL NETWORKS

BACKGROUND

Contact information of friends and acquaintances may be stored on mobile terminals, such as cellular radiotelephones. Today it is mainly a manual procedure to keep track of who your friends and acquaintances are and make sure that their contact information is added to and updated in your contact list.

SUMMARY

According to one implementation, a method may include receiving information about a geographic position of each of a plurality of mobile terminals for a particular time; determining a relationship between two of the mobile terminals based on the geographic position and the particular time; and automatically suggesting, based on the relationship, an exchange of contact information between the two mobile terminals.

Additionally, the method may include sending a first position request to the plurality of mobile terminals, the first position request including a current network time and indicating a particular time span for which geographic position information of the mobile terminal is requested; and sending a second position request to the plurality of mobile terminals, the second position request including another current network time and a specific time for which geographic position information of the mobile terminal is requested.

Additionally, the receiving information about a geographic position may include receiving a first position response from a mobile terminal, the first position response including position information that has at least one geographic point which corresponds to a position the mobile terminal has visited during a time span; and receiving a second position response from a mobile terminal, the second position request including position information that has at least one geographic point which corresponds to a position the mobile terminal has visited during a specific point in time.

Additionally, the determining a relationship between two of the mobile terminals may include comparing the position information in the first position response and the position information in the second position response from the mobile terminal with position information from another mobile terminal.

Additionally, automatically suggesting may include sending an exchange request to each of the two mobile terminals; receiving an accept response from at least one of the two mobile terminals, the accept response including a timestamp of the most recent contact information from the other of the two mobile terminals; and sending a contact information request to at least one of the two mobile terminals.

Additionally, automatically suggesting may further include receiving a contact information response from one of the two mobile terminals, the contact information response including contact information with a more recent timestamp than the timestamp of the most recent contact information from the other of the two mobile terminals; and sending the contact information from the contact information response to the other of the two mobile terminals.

Additionally, the contact information may be an update of contact information previously stored on one of the two mobile terminals.

Additionally, the contact information may not be associated with contact information stored on one of the two mobile terminals.

Additionally, the contact information may be one of an email address, an instant message address, a phone number, or a physical address.

According to another implementation, a system may include a server configured to communicate with a first mobile terminal and a second mobile terminal over a network. The server may include a processing unit to send a position request to the first mobile terminal and a second mobile terminal, the position request indicating a particular time span for which to provide geographic position information; receive geographic position information of each of the first mobile terminal and the second mobile terminal for the particular time span in the position request; compare the geographic position information of the first mobile terminal and the second mobile terminal to determine a relationship between the first mobile terminal and the second mobile terminal; and send a message to the first mobile terminal and the second mobile terminal to suggesting an information exchange of contact information between the first mobile terminal and the second mobile terminal.

Additionally, the system may include a memory providing temporary working storage to compare the geographic position information of the first mobile terminal and the second mobile terminal.

Additionally, the processing unit may be further configured to send another position request to the first mobile terminal and a second mobile terminal, the other position request indicating a specific time for which to provide geographic position information; and receive geographic position information of each of the first mobile terminal and the second mobile terminal for the specific time in the other position request.

Additionally, the processing unit may be further configured to receive contact information from the first mobile terminal, and send the contact information from the first mobile terminal to the second mobile terminal.

Additionally, the contact information may be one of an email address, an instant message address, a phone number, or a physical address.

Additionally, the contact information may not be related to contact information stored on the first mobile terminal.

Additionally, the contact information may be an update of contact information previously stored on the first mobile terminal.

Additionally, the system may include a position assist server to assist the first mobile terminal or the second mobile terminal in determining its own position.

According to yet another implementation, a method performed by a mobile terminal may include determining a geographic position of the mobile terminal for a particular time; storing the geographic position of the mobile terminal for the particular time; sending, to a server and in response to a request from the server, the geographic position of the mobile terminal for the particular time; and receiving a request to exchange contact information with another mobile terminal based on the geographic position of the mobile terminal for the particular time.

Additionally, the method may include automatically accepting the request to exchange contact information with the other mobile terminal, and receiving updated contact information of an existing contact stored in the mobile terminal.

Additionally, the method may include prompting a user of the mobile terminal to accept or reject the request to exchange contact information with the other mobile terminal, and sending to the server a response consistent with the user's accepting or rejecting the request to exchange contact information with the other mobile terminal.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may provide automatic detection of a user's personal network based on the user context and suggest an exchange of contact information with other mobile terminal user's within a user's personal network. In an exemplary implementation, the system may include a set of location aware mobile terminals and a network server. Each mobile terminal may keep track of its position, which is periodically reported to the server. The server can then detect which mobile terminals coincide both in time and location in a way that is typical for mobile terminal users who know each others and interact. The server can suggest an exchange of contact information to mobile terminal users that seem to be related.

A "mobile terminal," as the term is used herein, is intended to be broadly interpreted to include a mobile communication device (e.g., a radiotelephone, a personal communications system (PCS) terminal that may combine a cellular radiotelephone with data processing, a facsimile, and data communications capabilities, a personal digital assistant (PDA) that can include a radiotelephone, pager, Internet/intranet access, web browser, organizer, camera, a Doppler receiver, and/or global positioning system (GPS) receiver, a GPS device, a telephone, a cellular phone, etc.); a laptop computer; a personal computer; a printer; a facsimile machine; a pager; a camera (e.g., a contemporary camera or a digital camera); a video camera (e.g., a camcorder); a gaming device; and/or any other device capable of utilizing a touch screen display.

The term "user," as used herein, is intended to be broadly interpreted to include a mobile terminal or a user of a mobile terminal.

Figure 1:
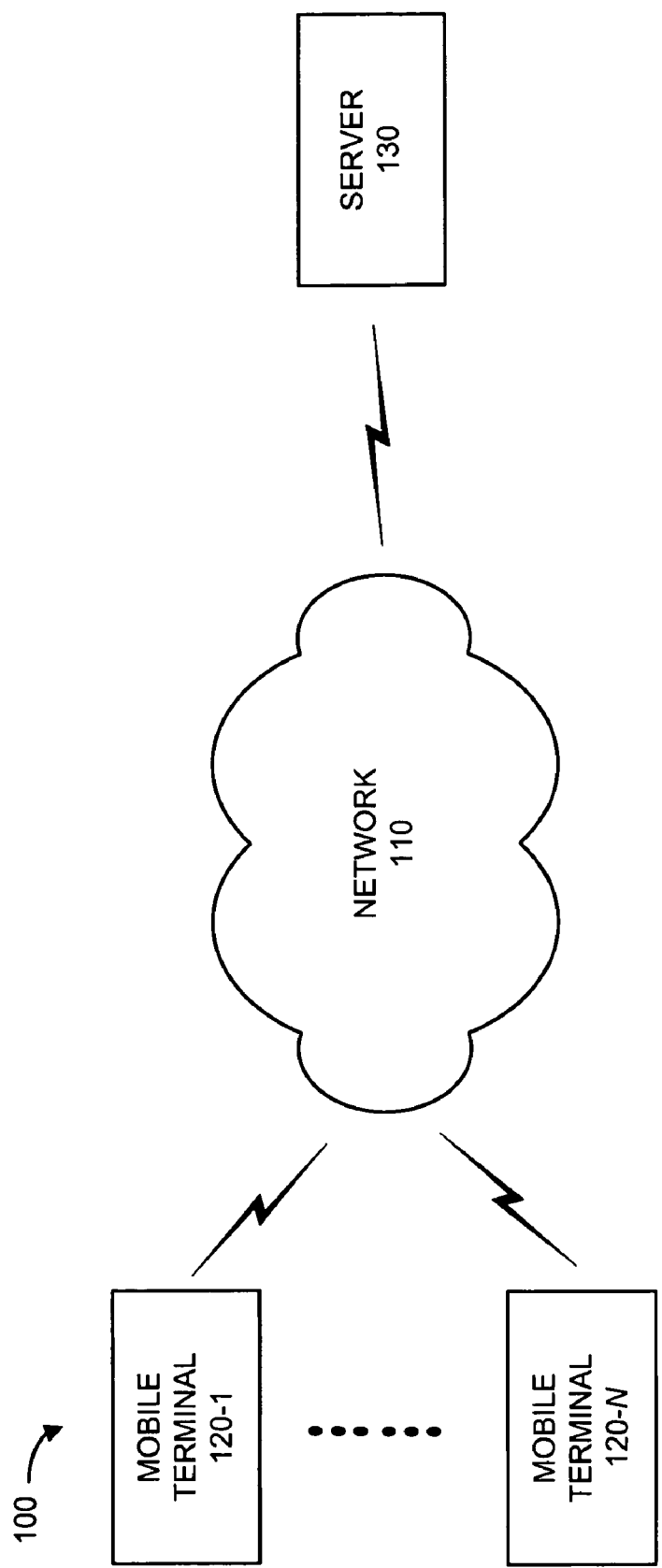
FIG. 1 illustrates an exemplary system in which exemplary embodiments may be implemented.

FIG. 1 illustrates an exemplary system 100 in which exemplary embodiments may be implemented. System 100 may include multiple mobile terminals 120-1 through 120-N (collectively referred to herein as "mobile terminals 120") connected with a server 130 via a network 110 using wired or wireless links. Network 110 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet or a combination of networks. The PLMN(s) may further include a packet-switched sub-network, such as, for example, General Packet Radio Service (GPRS), Cellular Digital Packet Data (CDPD), or Mobile IP sub-network.

Mobile terminals 120-1 through 120-N may include a telephone, cellular radiotelephone, Personal Communications System (PCS) terminal or the like equipped with one or more technologies for determining an absolute or relative geographic position. A PCS terminal may combine a cellular radiotelephone with data processing, facsimile and data communications capabilities. Mobile terminals 120-1 through 120-N may further include a personal digital assistant (PDA), a conventional laptop and/or palmtop receiver, or another appliance that includes a radiotelephone transceiver, or the like. A PDA may include a radiotelephone, Internet/intranet access, a web browser, Bluetooth technology and/or a GPS receiver. One or more of mobile terminals 120-1 through 120-N may further be referred to as a "pervasive computing" device.

Server 130 may include a server entity that may obtain position information regarding each of mobile terminals 120-1 through 120-N and may compare the position information to determine a relation between respective ones of mobile terminals 120-1 through 120-N. In some implementations, server 130 may identify a relation between respective ones of mobile terminals 120-1 through 120-N and send a message to each of the related mobile terminal to suggest an exchange of contact information between the mobile terminals.

Figure 2:
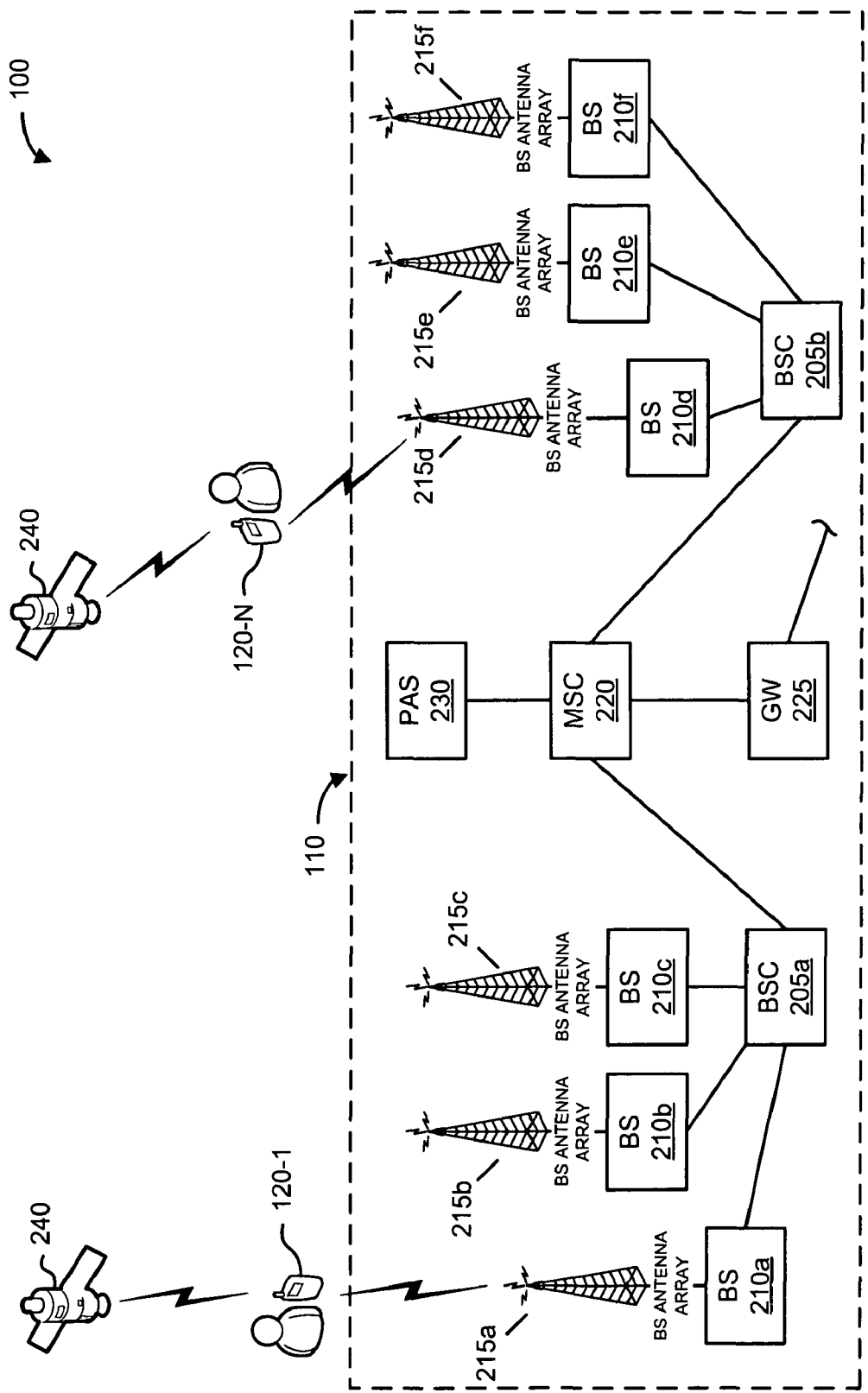
FIG. 2 illustrates an exemplary embodiment in which the system of FIG. 1 includes a public land mobile network.

FIG. 2 illustrates one example of system 100 implemented using a cellular network. System 100 may include mobile terminal 120-1 and mobile terminal 120-N, network 110 (e.g., a PLMN), and GPS satellites 240. Network 110 may include one or more base station controllers (BSCs) 205*a*-205*b*, multiple base stations (BSs) 210*a*-210*f*, multiple base station antenna arrays 215*a*-215*f*, one or more mobile switching centers (MSCs), such as MSC 220, one or more gateways (GWs), such as GW 225, and a position assist server (PAS) 230.

Network 110 may include components used for transmitting data to and from mobile terminals 120-1 and 120-N. Such components may include base station antenna arrays 215*a*-215*f*, which transmit and receive, via appropriate data channels, data from mobile stations within their vicinity. Base stations 210*a*-210*f* connect to their respective antenna arrays 215a-215f, and format the data transmitted to or received from antenna arrays 215a-215f in accordance with existing techniques, to enable communication with BSCs 205a-205b or a mobile station, such as mobile terminals 120-1 or 120-N. Among other functions, BSCs 205a-205b may route received data to either MSC 220 or a base station (e.g., BSs 210a-210c or 210d-210f). MSC 220 routes received data to BSC 205a or 205b. GW 225 may route data received from an external domain (not shown) to an appropriate MSC (such as MSC 220), or from an MSC to an appropriate external domain. Server 130 (not shown in FIG. 2) may connect to network 110 via MSC 220 or via another network (e.g., the Internet) connected to GW 225.

Mobile terminals 120-1 and 120-N may receive information from one or more global GPS satellites 240 to determine a geographic location of mobile terminals 120-1 and 120-N. Mobile terminals 120-1 and 120-N may also optionally communicate with PAS 230 to assist mobile terminals 120-1 and 120-N in determining their positions. PAS 230 may, for example, track the position of GPS satellites 240 through a network of stationary GPS receivers distributed across a coverage area of a wireless network. PAS 230 may determine approximate locations of mobile terminals 120-1 and 120-N based on the signals from local base stations and provide mobile terminals 120-1 and 120-N with identification information for particular GPS satellites 240 that are likely to be in range of mobile terminals 120-1 and 120-N. Mobile terminals 120-1 and 120-N may then listen to one of GPS satellites 240 to determine its respective geographic position.

Exemplary User Device Configuration

Figure 3:
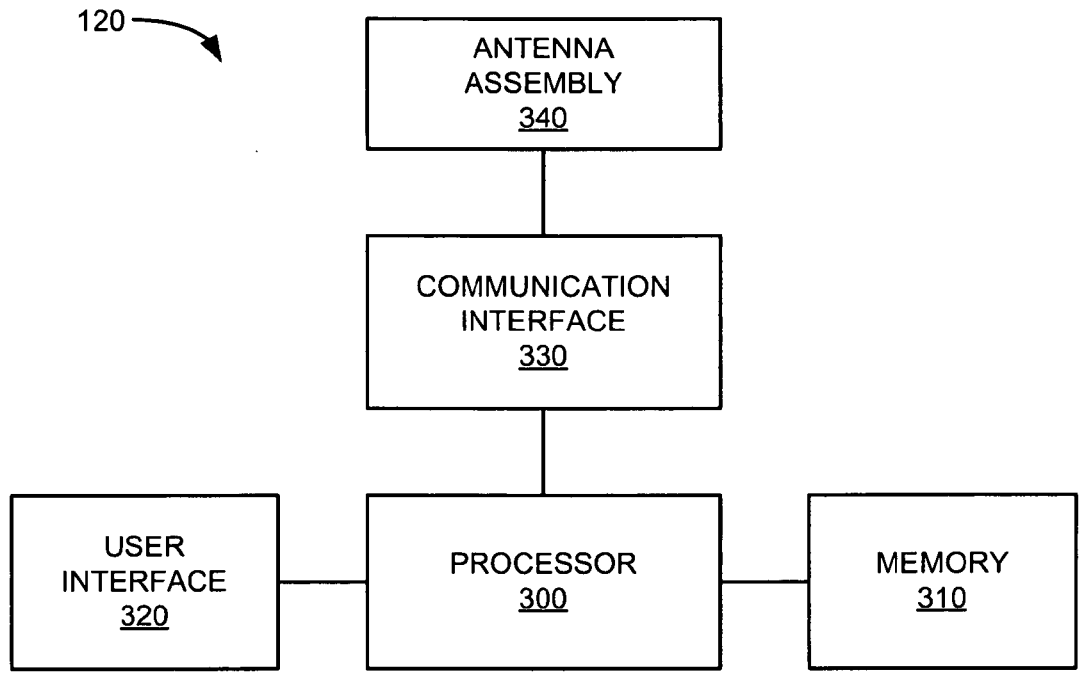
FIG. 3 illustrates a mobile terminal according to an exemplary embodiment.

FIG. 3 illustrates a diagram of exemplary components of mobile terminal 120. As illustrated, mobile terminal 120 may include a processor 300, a memory 310, a user interface 320, a communication interface 330, and/or an antenna assembly 340.

Processor 300 may include a microprocessor, an application-specific integrated circuit (ASIC), a field-programmable gate array (FPGA), or the like. Processor 300 may control operation of mobile terminal 120 and its components. In one implementation, processor 300 may control operation of components of mobile terminal 120 in a manner described herein.

Memory 310 may include a random access memory (RAM), a read-only memory (ROM), and/or another type of memory to store data and instructions that may be used by processor 300. Memory 310 may be sufficient to store historical geographic position information (such as GPS location data or other position data) of mobile terminal 120 for particular time intervals. In one exemplary implementation, memory 310 may be capable of storing historical geographic position information for one week. Memory 310 may also store contact information for the user of mobile terminal 120 and for other contacts. Contact information may include, for example, names, email addresses, instant message addresses, phone numbers, social networking service (SNS) identifications (IDs), physical addresses, and/or photographs. Memory 310 may also be sufficient to enable multiple applications or instances of applications to run simultaneously on mobile terminal 120. For example, in one implementation, memory 310 may support the displaying and updating of multiple open application windows.

User interface 320 may include mechanisms for inputting information to mobile terminal 120 and/or for outputting information from mobile terminal 120. Examples of input and output mechanisms might include buttons (e.g., control buttons, keys of a keypad, a joystick, etc.) or a touch screen interface (e.g., a display and a touch panel) to permit data and control commands to be input into mobile terminal 120; a speaker to receive electrical signals and output audio signals; a microphone to receive audio signals and output electrical signals; a display to output visual information (e.g., text input into mobile terminal 120); a vibrator to cause mobile terminal 120 to vibrate; and/or a camera to capture video and/or images.

Communication interface 330 may include, for example, a transmitter that may convert baseband signals from processor 300 to radio frequency (RF) signals and/or a receiver that may convert RF signals to baseband signals. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, mobile terminal 120 may perform certain operations described herein in response to processor 300 executing software instructions of an application contained in a computer-readable medium, such as memory 310. A computer-readable medium may be defined as a physical or logical memory device. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of mobile terminal 120, in other implementations, mobile terminal 120 may contain fewer, additional, different, or differently arranged components than depicted in FIG. 3. In still other implementations, one or more components of mobile terminal 120 may perform one or more other tasks described as being performed by one or more other components of mobile terminal 120.

Exemplary Server

Figure 4:
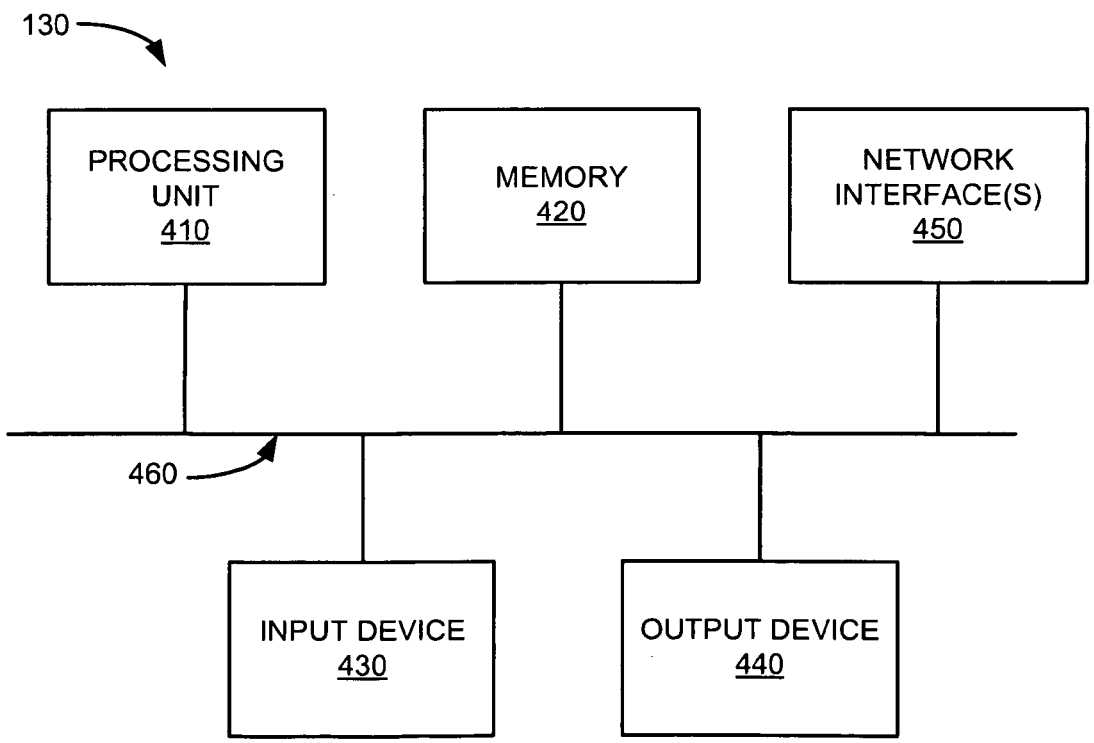
FIG. 4 illustrates a server according to an exemplary embodiment.

FIG. 4 illustrates server 130 consistent with an exemplary embodiment. Server 130 may include a processing unit 410, a memory 420, an input device 430, an output device 440, a network interface(s) 450, and a bus 460.

Processing unit 410 may perform all data processing functions for inputting, outputting, and processing of data. Processing unit 410 may include a processor, microprocessor, or processing logic that may interpret and execute instructions. For example, as described further herein, processing unit 410 may allow server 130 to send a position request to mobile terminals 120, receive geographic position information from mobile terminals 120, compare the geographic position information of the mobile terminals 120 to determine a relationship between two mobile terminals, and send messages to the related mobile terminals to suggest an exchange of contact information between the two mobile terminals.

Memory 420 may provide permanent, semi-permanent, or temporary working storage of data and instructions for use by processing unit 410 in performing processing functions. Memory 420 may include large-capacity storage devices, such as a magnetic and/or optical recording medium and its corresponding drive. As described further herein, in one implementation, memory 420 may provide temporary working storage for comparing geographic position information received from mobile devices 120. Input device 430 may include a mechanism that permits an operator to provide information to server 130, such as a keyboard, a mouse, a pen, voice recognition and/or biometric mechanisms, etc. Output device 440 may include a mechanism that outputs information to the operator, including a display, a printer, a speaker, etc.

Network interface(s) 450 may include any transceiver-like mechanism that enables server 130 to communicate with other devices and/or systems. For example, network interface 450 may include mechanisms for communicating with another device (such as mobile terminal 120 or another server) or system via a network, such as network 110. Bus 460 may interconnect the various components of server 130 to permit the components to communicate with one another.

Server 130, consistent with exemplary implementations, may perform certain processes, as will be described in detail below. Server 130 may perform these processes in response to processing unit 410 executing software instructions contained in a computer-readable medium, such as memory 420. A computer-readable medium may be defined as a physical or logical memory device and/or a carrier wave.

The software instructions may be read into memory 420 from another computer-readable medium, or from another device via network interface 450. The software instructions contained in memory 420 may cause processing unit 410 to perform processes that will be described later. Alternatively, hardwired circuitry may be used in place of or in combination with software instructions to implement processes consistent with exemplary implementations. Thus, implementations are not limited to any specific combination of hardware circuitry and software.

The configuration of components of server 130 illustrated in FIG. 4 is for illustrative purposes only. In other implementations, server 130 may contain fewer, additional, different, or differently arranged components than depicted in FIG. 4. In still other implementations, one or more components of server 130 may perform one or more other tasks described as being performed by one or more other components of server 130.

Exemplary Process

Figure 5:
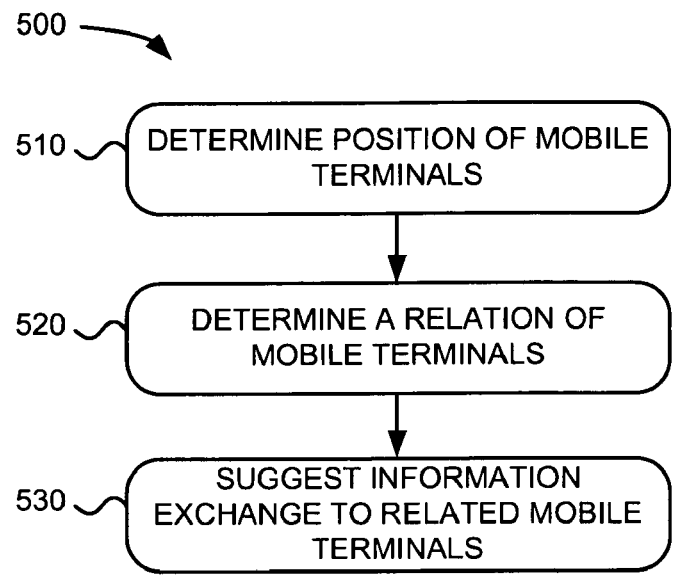
FIG. 5 is a flowchart of an exemplary process for predictive personal networking according to implementations described herein.

FIG. 5 depicts a flow chart of an exemplary process 500 for predictive personal networking according to implementations described herein. In one implementation, process 500 may be performed by hardware, software, or a combination of hardware and software components of both server 130 and mobile terminal(s) 120. In other implementations, process 500 may be performed by hardware, software, or a combination of hardware and software components of server 130 and mobile terminal 120 in combination with hardware, software, or a combination of hardware and software components of another device (e.g., communicating with server 130 via network interface 450 or communicating with mobile terminal 120 via communication interface 330).

Figure 6:
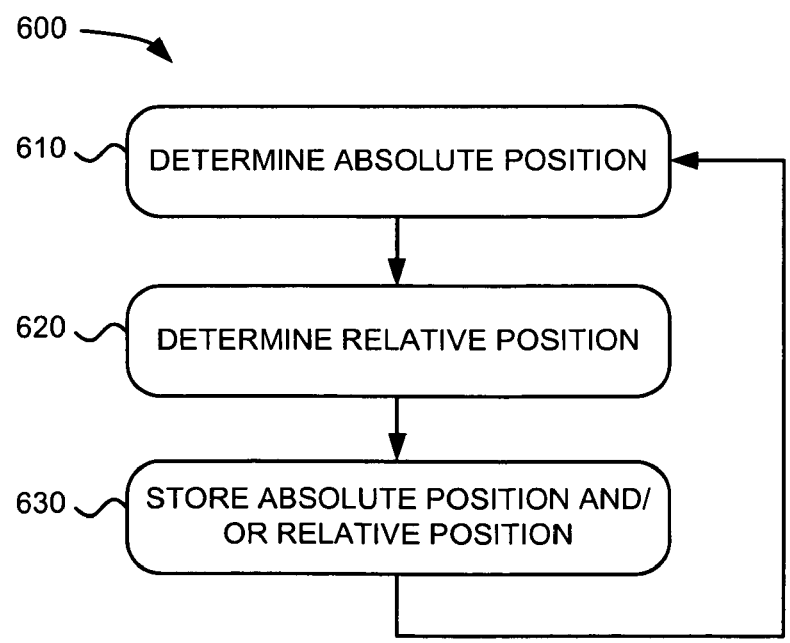
FIG. 6 is a flowchart of an exemplary process for mobile terminal identification of a position.

As illustrated in FIG. 5, process 500 may begin by determining positions of participating mobile terminals (block 510). For example, server 130 may solicit and receive geographic position information from mobile terminals that are participating in the predictive personal networking service. In one implementation, each participating mobile terminal 120 may identify its position for a particular time and/or time span and provide its position information to server 130. FIG. 6 provides additional details of a process 600 for a mobile terminal to identify a position.

Referring to FIG. 6, an absolute position may be determined for the mobile terminal (block 610). For example, mobile terminal 120 may use integrated positioning devices to keep constant track of the position of mobile terminal 120. Mobile terminal 120 may use, for example, GPS technology to identify its geographic position. In one implementation, mobile terminal 120 may communicate with PAS 230 to assist mobile terminal 120 in determining its own position. In another implementation, other forms of global navigation satellite system (GNSS) information may be used. In still another implementation, location information may be determined using cellular tower triangulation information collected by mobile terminal 120.

A relative position may be determined for the mobile terminal (block 620). For example, mobile terminal 120 may identify location information based on a location associated with a nearby device. In one implementation, Bluetooth technology may be used to identify the position of mobile terminal 120 by having mobile terminal 120 communicate with another device having a known position.

In one implementation, mobile terminal 120 may be capable of both absolute positioning and relative positioning. In other implementations, mobile terminal 120 may support only absolute positioning or accurate relative positioning. The output of the positioning process may be updated information of the mobile terminal location and updated information about which other devices are available close by, at any time.

The absolute position information and/or the relative position information may be stored (block 630). For example, in one implementation, mobile terminal 120 may compress and store position data within a memory (e.g., memory 310) of mobile terminal 120. The position information may be stored for a certain time period (e.g., one week). In another implementation, the position information may be sent to server 130 and stored within a memory (e.g., memory 420) of server 130.

Figure 7A:
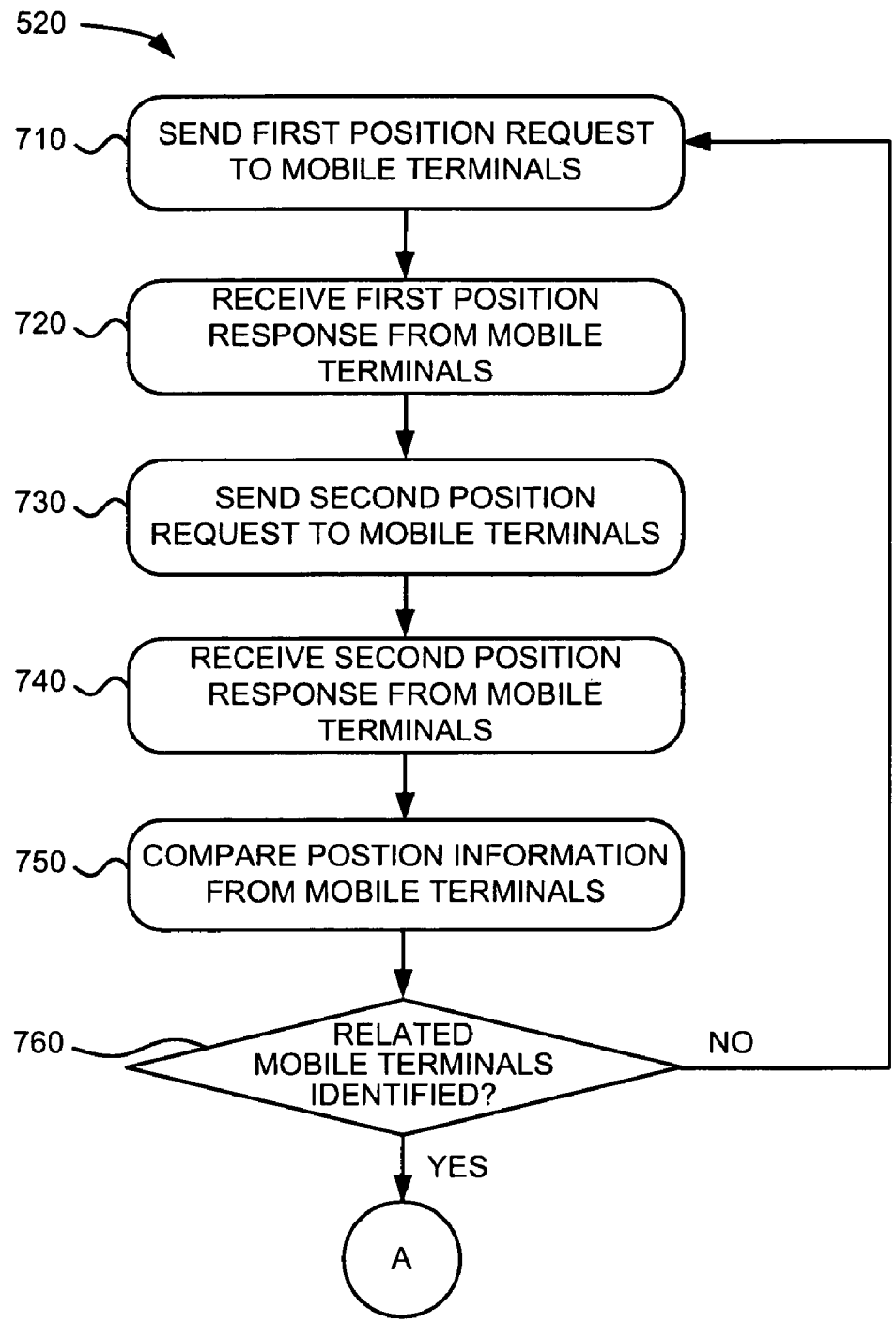
FIG. 7A is a flowchart of an exemplary process for determining a relationship among mobile terminals.

Returning to FIG. 5, a relationship of the mobile terminals may be determined (block 520). For example, server 130 may periodically probe mobile terminals 120 for their positions to determine if a mutual relationship may be identified based on corresponding locations and times of two mobile terminals 120. FIG. 7A provides additional details of the process 520 of a server determining relation of mobile terminals.

Referring to FIG. 7A, a first position request (FPRQ) may be sent to a mobile terminal (block 710). For example, server 130 may send an FPRQ to one or more mobile terminals 120. At least two implementations may be used to collect stored information from mobile terminals 120, depending on the network setup of each mobile terminal 120. In one implementation, some mobile terminals 120 may be continuously accessible from a network (e.g., network 110). In this case, server 130 may connect to mobile terminal 120 and make a first position request (FPRQ). In another implementation, some mobile terminals 120 may not be continuously accessible from the network. In this case, mobile terminals 120 may connect to server 130 periodically, and server 130 may then make an FPRQ during the periodic connections.

The FPRQ from server 130 to mobile terminal 120 may contain the current network time and a particular time span for which geographic position information of mobile terminal 120 should be provided. The FPRQ may be scalable. Thus, server 130 may adapt the time span and/or the frequency of each FPRQ to the number of mobile terminals 120 the server has to account for. The server can try to monitor mobile terminal 120 time consecutively. But if the load on server 130 is high, server 130 may skip time spans in order to reduce the amount of processing and access time for each mobile terminal 120. The consequence of such skips may be that a social network related to mobile terminal 120 takes longer time to detect.

A first position response (FPRP) from the mobile terminal may be received (block 720). For example, in response to the FPRQ from server 130, mobile terminal 120 may send a FPRP to server 130. The FPRP may include one or more geographic regions or points which correspond to the positions mobile terminal 120 has visited during the requested time span. The FPRP may also contain information on relative position of the device, e.g. which radio entities are within detection range (e.g., WiFi or cell base stations, Bluetooth units, etc.). The FPRQ and FPRP may give server 130 a general indication of the whereabouts of mobile terminal 120 during the time span identified in the FPRQ.

A second position request (SPRQ) may be sent to a mobile terminal (block 730). For example, server 130 may send an SPRQ to one or more mobile terminals 120. The SPRQ may follow the FPRQ and FPRP. In an exemplary implementation, the SPRQ may contain the network time and one or more specific time points. For example, the SPRQ may include the current network time and a specific time within the time span of the FPRQ for which geographic position information of mobile terminal 120 is requested.

A second position response (SPRP) from the mobile terminal may be received (block 740). For example, in response to the SPRQ from server 130, mobile terminal 120 may send a SPRP to server 130. The SPRP may include recorded locations of mobile terminal 120 for the specific point (or points) in time identified in the SPRQ.

The position information from the mobile terminals may be compared (block 750). For example, server 130 may compare the position information in the FPRP and the SPRP from a particular mobile terminal 120 with position information from other mobile terminals 120. Server 130 may compare the locations of mobile terminal 120 at the specific time points with the locations of other mobile terminals at the same specific time points. If the locations of two mobile terminals 120 coincide, a mutual hit may be recorded by server 130.

The SPRQ may simplify the computational task of comparing all positions of all mobile terminals 120 at all time points. For example, in response to an FPRQ, an FPRP may give server 130 one subset of mobile terminals 120 that could have had coinciding locations during a time period for each intersection of the responded regions. The SPRQ may then be used to probe some identical time points among mobile terminals 120 in each such subset to identify the ones that were close (e.g., within a particular distance) to each other. Server 130 can decide how many time points to check with each subset of mobile terminals in order to scale the processing and access time for each mobile terminal 120.

It may be determined if related mobile terminals are identified (block 760). A relation may be identified based on criteria stored within server 130. In one implementation, a relation between mobile terminals may be based on a particular number of mutual location/time incidents within a particular span. For example, if server 130 records a specific number of mutual hits between two mobile terminals 120 over a time period (e.g., 10 hits during the latest four weeks), the two mobile terminals 120 may be considered to be related. In an exemplary implementation, the criteria for determining what constitutes a relation between mobile terminals may be set by each user of a mobile terminal. In another implementation, the criteria for determining a relation between mobile terminals may determined by an operator of server 130. In still another implementation, a mobile terminal user may select from a limited number of criteria for determining what constitutes a relation between mobile terminals. If mobile terminals 120 are identified as related, server 130 may execute the suggestion process as described below with respect to block 530 of FIG. 5.

Figure 7B:
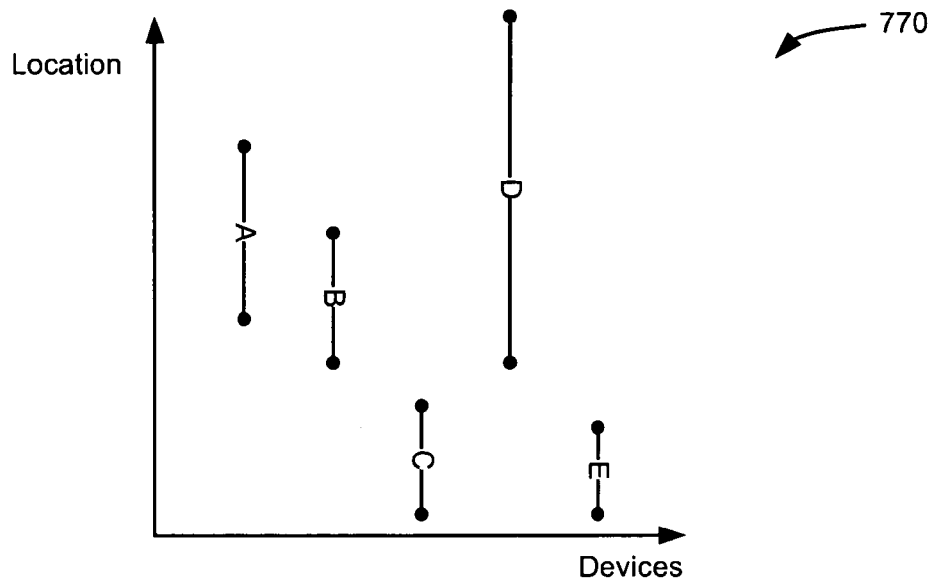
FIG. 7B is an illustration of how information in first position responses and second position responses may be used to identify related mobile terminals.
Figure 7B:
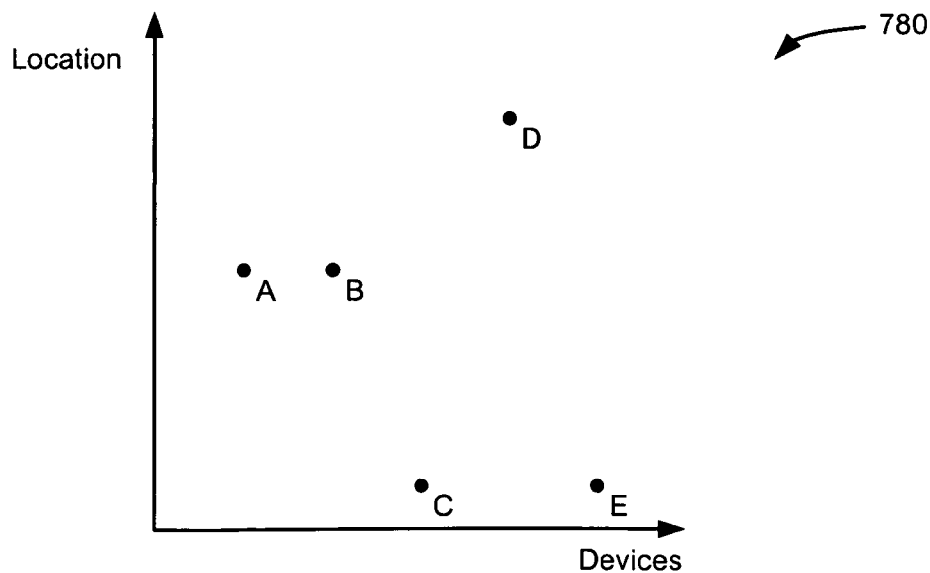

FIG. 7B provides an illustration of how information in FPRPs and SPRPs may be used to identify related mobile terminals. Chart 770 illustrates exemplary position information from FPRPs of five different mobile terminals 120, denoted as A, B, C, D, and E. Chart 770 shows a range of locations that were visited by each of the five devices during a particular time period, $T_1$–$T_2$. Base on the FPRPs, server 130 may identify two subsets with potential overlapping locations: subset A, B, D and subset C, E. Using these subsets, sever 130 may perform more limited comparisons within each subset to identify whether any of mobile terminals in subset A, B, D and subset C, E have a common position (e.g., an approximate mutual position within a particular distance) at a common time. Chart 780 shows absolute locations that were visited by each of the five devices during a particular time, $(T_1+T_2)/2$. As shown in chart 780, A and B of subset A, B, D have a common position. Also, as shown in chart 780, C and E of subset C, E have a common position.

FIG. 7A and 7B show how FPRPs and SPRPs may provide a computationally-efficient method of identifying related mobile terminals 120. However, in other implementations, position information may be from mobile terminals 120 using fewer or more request and response iterations.

Figure 8A:
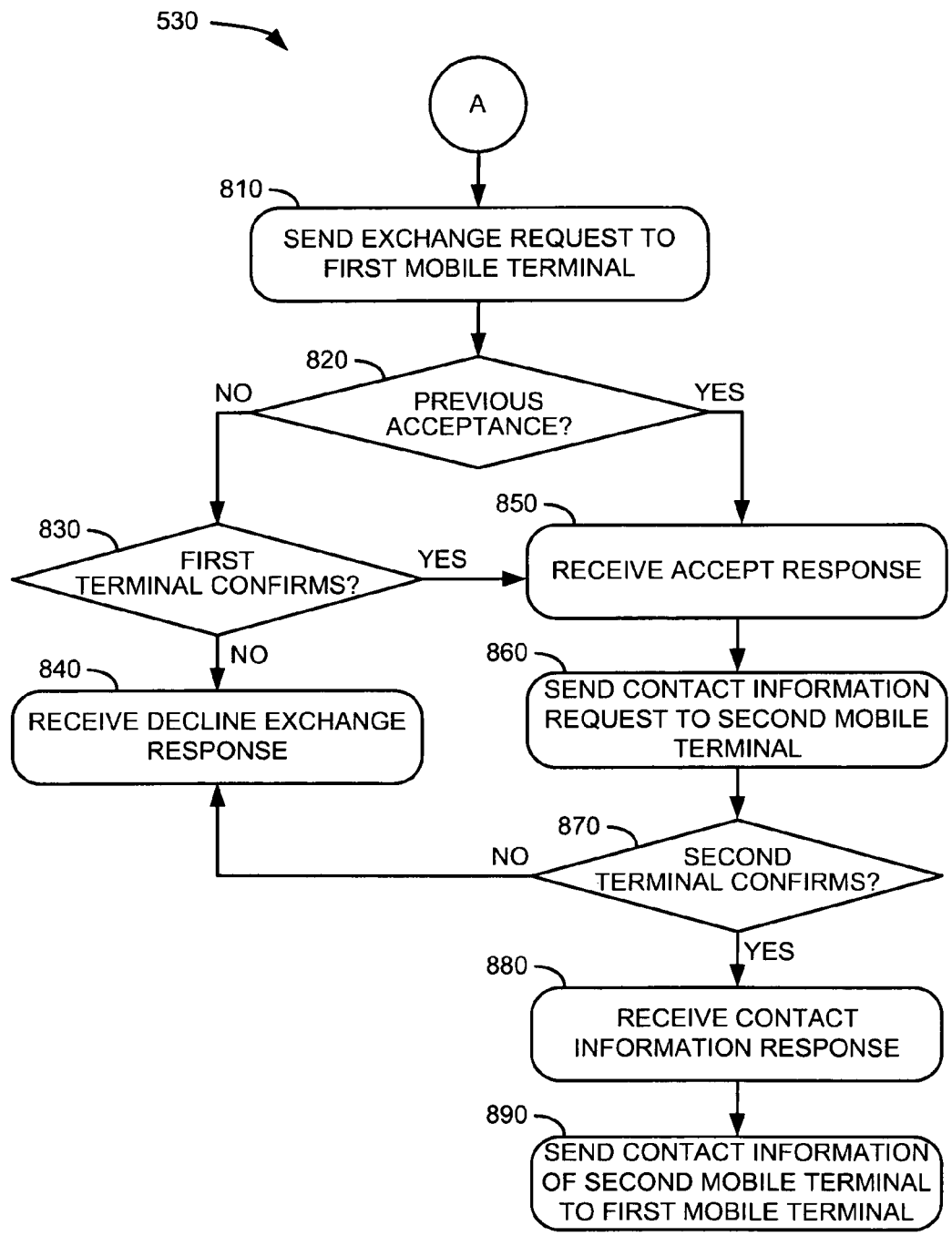
FIG. 8A is a flowchart of an exemplary process for suggesting an information exchange between mobile terminals.

Returning again to FIG. 5, an information exchange suggestion may be provided to related mobile terminals (block 530). For example, based on the relation of two mobile terminals 120 (as determined by the comparison of the FPRP and SPRP information described above), server 130 may suggest an information exchange between the two mobile terminals 120. FIG. 8A provides additional details of an exemplary implementation of the process 530 of a server suggesting an information exchange between mobile terminals.

Referring to FIG. 8A, when server 130 decides that two mobile terminals 120 are related, as described above, a suggestion process is started. To simplify the description, the process of FIG. 8A is described in the context of a first mobile terminal 120-1 receiving updated information from a second mobile terminal 120-2. However, in the systems and methods described herein, mobile terminals 120-1 and 120-2 may perform the functions of both first mobile terminal 120-1 and second mobile terminal 120-2, such that both terminals may be exchanging new or updated information.

An exchange request may be provided to a first mobile terminal (block 810). Server 130 sends an exchange suggestion request (ESRQ) to each of first mobile terminal 120-1 and second mobile terminal 120-2, including descriptive information of the other mobile terminal (e.g., name and photo of the user of the mobile terminal). The descriptive information used by server 130 may have been provided to server 130 by the user of the corresponding mobile terminal, for example, at the time of entering the system or at a later point.

It may be determined if information from a second mobile terminal has been previously accepted (block 820). For example, first mobile terminal 120-1 may review contact information stored in a memory (e.g., memory 310) to determine if contact information for the user of second mobile terminal 120-2 has been previously accepted. If contact information already exists, first mobile terminal 120-1 can assume that the user will be interested in an update of the contact information, if necessary. If no contact information already exists for the user of second mobile terminal 120-2, first mobile terminal 120-1 may seek user authorization.

Figure 8B:
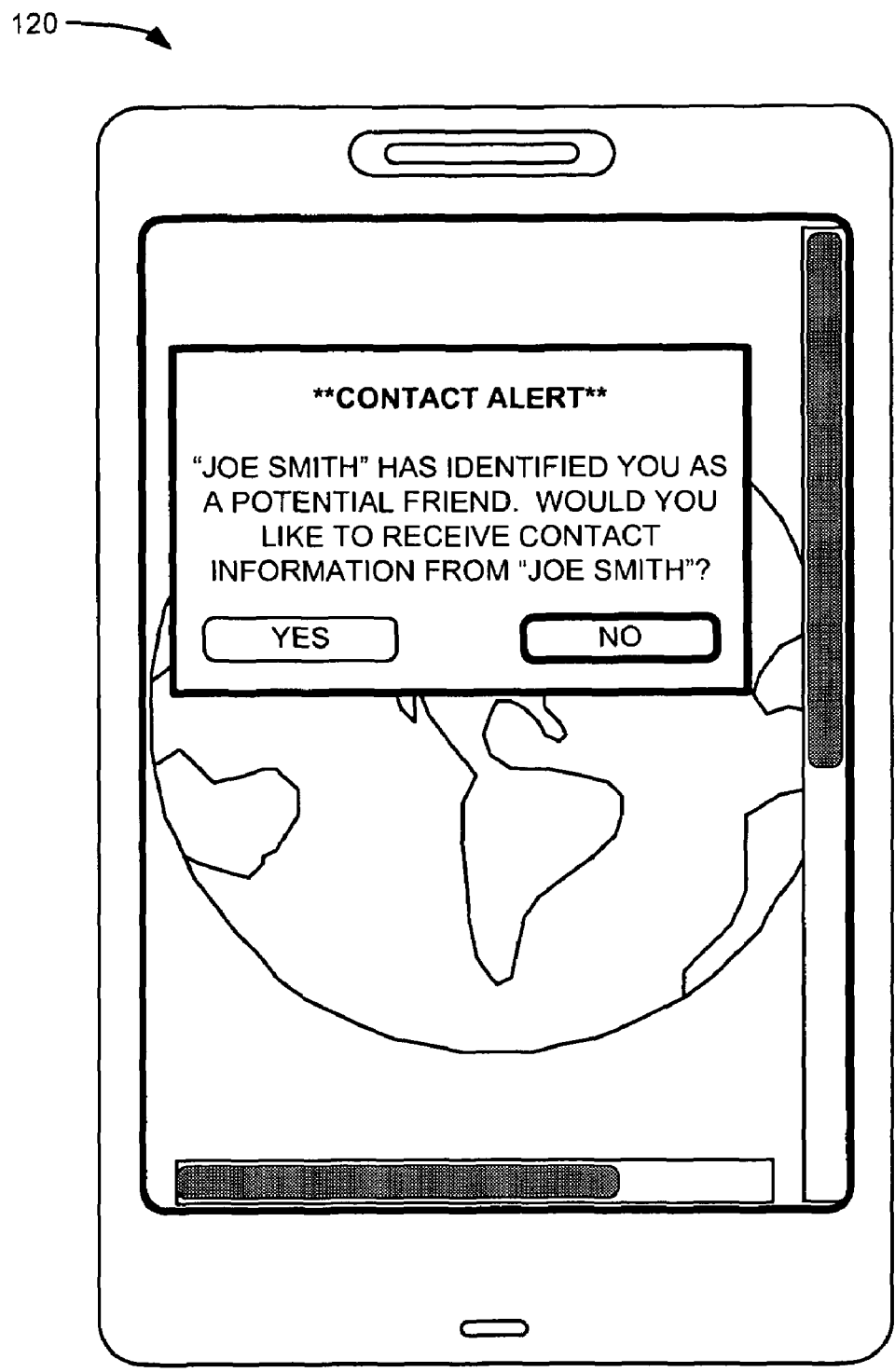
FIG. 8B is an illustration of an exemplary mobile terminal displaying a contact alert message.

It may be determined if information from a second mobile terminal is accepted (block 830). For example, if first mobile terminal 120-1 previously has not accepted the information from second mobile terminal 120-2, first mobile terminal 120-1 will ask the user for confirmation that the user is interested in the contact information of the user of second mobile terminal 120-2. FIG. 8B provides an illustration of an exemplary mobile terminal 120 displaying a contact alert message that requests a user to confirm if the user is interested in contact information of another mobile terminal user (e.g., "Joe Smith"). If the user confirms, second mobile terminal 120-2 can send an Accept Response (ARP) back to server 130. Otherwise, if the user declines, a decline response (DRP) will be sent back. Thus, a decline exchange response may be received (block 840). For example, server 130 may receive the decline exchange response from first mobile terminal 120-1.

If information from a second mobile terminal is accepted, an accept response may be received (block 850). For example, if the first mobile terminal 120-1 has accepted the information from the second mobile terminal 120-2, first mobile terminal 120-1 may respond automatically with an ARP, including a time stamp of the latest made update. Server 130 may receive the ARP.

A contact information request may be sent to the second mobile terminal (block 860). For example, if an ARP is sent by the first mobile terminal 120-1 to server 130 (in response to the exchange request), a contact information request (CIRQ) may sent by server 130 to second mobile terminal 120-2.

It may be determined if the contact information request is accepted (block 870). For example, if the second receiving mobile terminal 120-2 previously has not accepted the information from first mobile terminal 120-1, second mobile terminal 120-2 will ask the user for a confirmation that the user is interested in the contact information of the user of first mobile terminal 120-1. If the user declines, second mobile terminal 120-2 may send a decline response (DRP) back to sever 130. Thus, a decline exchange response may be received (block 840). For example, server 130 may receive the decline exchange response from second mobile terminal 120-2.

If the CIRQ is accepted, a contact information response may be received (block 880). For example, if second mobile terminal 120-2 previously has accepted information to share with first mobile terminal 120-1 or if the user of second mobile terminal 120-2 accepts the CIRQ, second mobile terminal 120-2 can compare the updated time stamp from first mobile terminal 120-1 with the last modification time of the contact information of second mobile terminal 120-2 and respond to server 130 with a contact information response (CIRP), if necessary. The CIRP may include contact information of the user of second mobile terminal 120-2 that has a more recent timestamp than that of the timestamp sent from first mobile terminal 120-1. The CIRP may be received by server 130.

Contact information of the second mobile terminal may be sent to the first mobile terminal (block 890). For example, in one implementation, the content of the CIRP may be passed on by server 130 as a contact information update (CIU) message to first mobile terminal 120-1. In another implementation, if second mobile terminal 120-2 has not previously shared contact information with first mobile terminal 120-1, the user of second mobile terminal 120-2 may confirm that the user of first mobile terminal 120-1 is allowed to view its contact information. If the user of first mobile terminal 120-1 accepts, a CIRP is sent from second mobile terminal 120-2 to server 130, resulting in a CIU to first mobile terminal 120-1. Otherwise, a DRP is sent back to server 130.

In another exemplary implementation of the process 530 of a server suggesting an information exchange between mobile terminals, a suggestion may be facilitated through a social networking service (SNS), such as a web-based SNS like Facebook or MySpace. For example, if contact information for each mobile terminal user (e.g., first mobile terminal 120-1 and second mobile terminal 120-2) includes an SNS ID, the SNS ID may be provided to server 130. The SNS ID may be provided to server 130, for example, as part of a registration process. If both users have an SNS ID, server 130 may suggest an information exchange between the two mobile terminals 120 by sending to a particular SNS the SNS IDs of each user, along with an indication that the users of the two mobile terminals may know each other. The SNS may then provide a suggestion or an invitation to each of the users to add a friend in accordance with protocols for the particular SNS.

Examples

Figure 9:
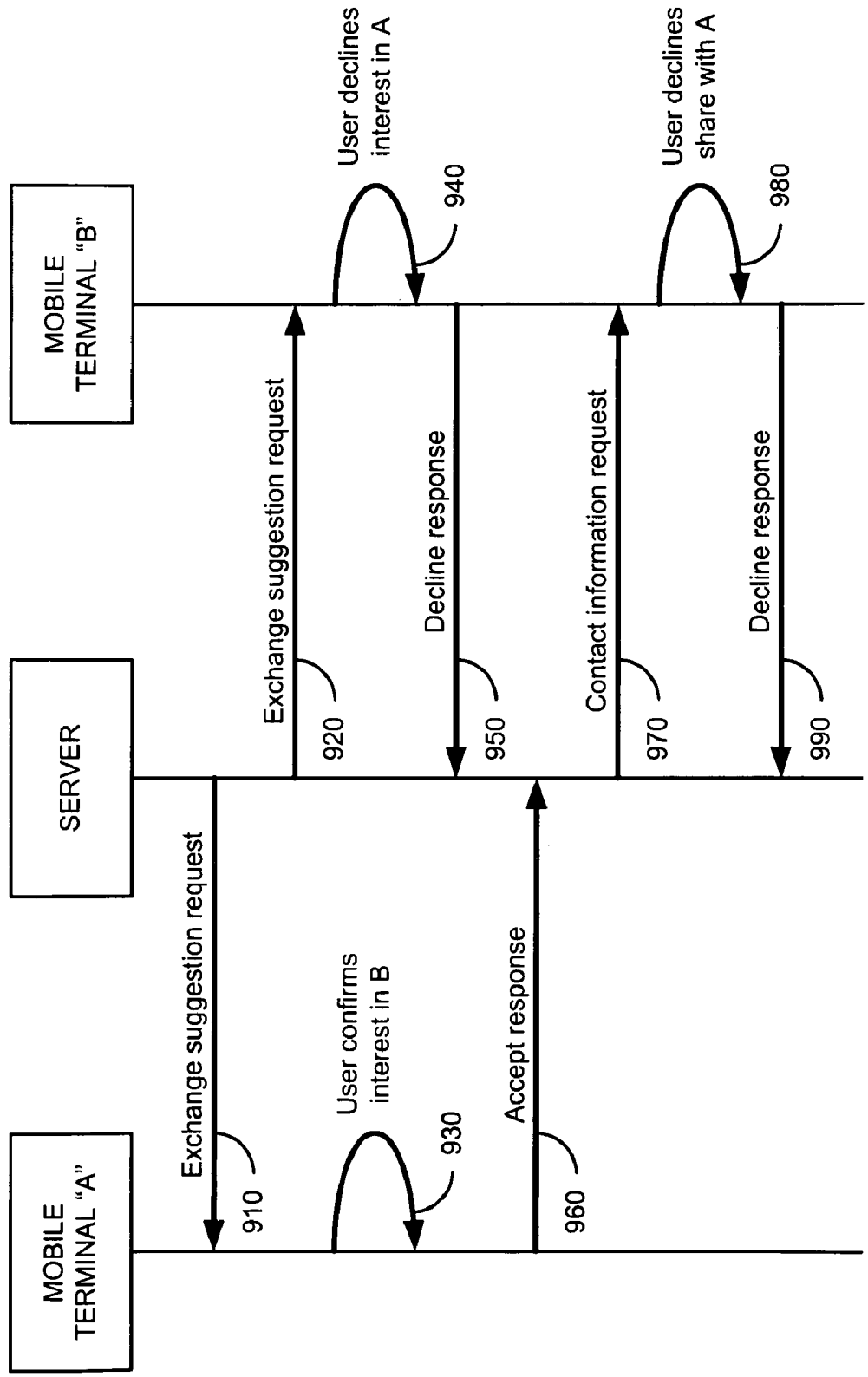
FIG. 9 illustrates an exemplary communication sequence for suggesting updates to a personal network.

FIG. 9 provides an exemplary communication sequence for suggesting updates to a personal network. Assume in the example of FIG. 9 that mobile terminal "A" is interested in mobile terminal "B," but mobile terminal "B" declines mobile terminal "A."

Based on a location/time relation, a server (e.g. server 130) may send an ESRQ to mobile terminal "A" (line 910) and mobile terminal "B" (line 920). Prompted by the ESRQ, the user of terminal A may confirm an interest in receiving contact information from mobile terminal "B" (line 930). However, the user of terminal B may respond to the ESRQ by declining an interest in receiving contact information from mobile terminal "A" (line 940). Thus, mobile terminal "B" will provide a DRP to the server (line 950), while mobile terminal "A" will provide an ARP to the server (line 960).

Based on the ARP from mobile terminal "A", the server may send a CIRQ to mobile terminal "B" to request that mobile terminal "B" provide contact information to mobile terminal "A" (line 970). However, the user of mobile terminal "B" also declines the CIRQ (line 980). Thus, mobile terminal "B" will provide a DRP to the server (line 990), and no information is exchanged between mobile terminal "A" and mobile terminal "B."

Figure 10:
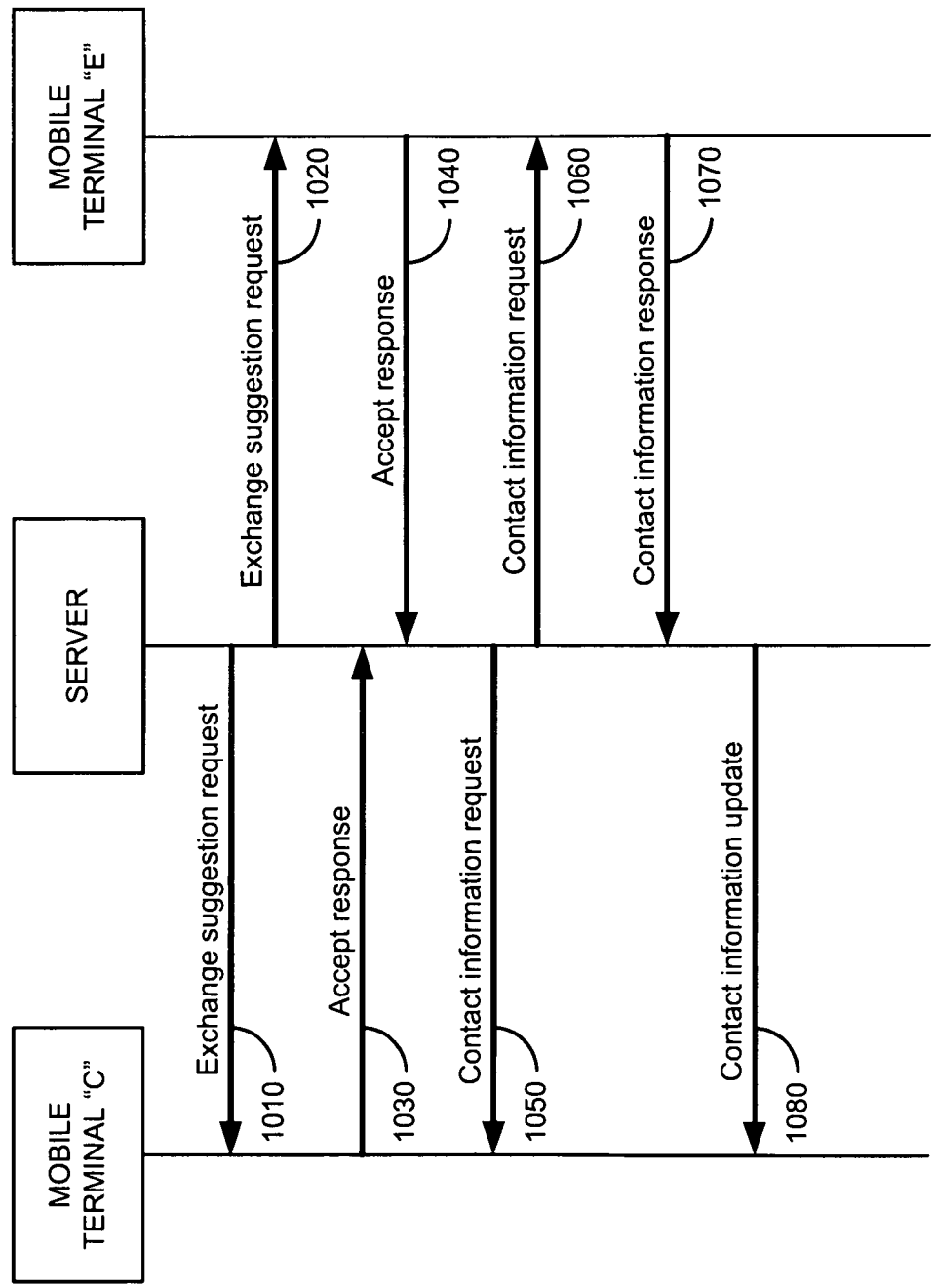
FIG. 10 illustrates another provides an exemplary communication sequence for suggesting updates to a personal network.

FIG. 10 provides another exemplary communication sequence for suggesting updates to a personal network. Assume, in the example of FIG. 10, that mobile terminal "C" and mobile terminal "E" have previously accepted each other's contact information, and that mobile terminal "E" has updated contact information.

Based on a location/time relation, a server (e.g. server 130) may send an ESRQ to mobile terminal "C" (line 1010) and mobile terminal "E" (line 1020). Because mobile terminal "C" and mobile terminal "E" have previously accepted each other's contact information, each mobile terminal may provide an automatic response to accept updates to the contact information of mobile terminal "C" and/or mobile terminal "E." Thus, an ARP with an updated time stamp of the latest contact information may be automatically sent to the server by mobile terminal "C" (line 1030) and by mobile terminal "E" (line 1040). In response to each ARP, the server will send a CIRQ to mobile terminal "C" (line 1050) and mobile terminal "E" (line 1060) to request updated contact information from each of mobile terminal "C" and mobile terminal "E." Mobile terminal "E" may provide an automatic CIRP that includes updated contact information (line 1070). Since mobile terminal "C" does not have any contact information to provide, in one implementation, mobile terminal "C" may not respond to the CIRQ. In another implementation, mobile terminal "C" may provide a CIRP that states no update is required. The server may use the information in the CIRP from mobile terminal "E" to provide a CIU to mobile terminal "C" (line 1080).

Conclusion

Systems and/or methods described herein may provide automatic detection of a user's personal network based on the context of the user's position and suggest an exchange of contact information with other mobile terminal user's within a user's personal network. A server may receive information about a geographic position of multiple mobile terminals for a particular time. The server may determine a relation between at least two of the mobile terminals based on the geographic position at the particular time and automatically suggest, based on the relation, an information exchange of contact information between the at least two mobile terminals.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks and/or lines have been described with regard to FIGS. 5, 6, 7A, 8A, 9 and 10 the order of the blocks and/or lines may be modified in other implementations. Further, non-dependent blocks or lines may be performed in parallel.

It should be emphasized that the term "comprises" and/or "comprising," when used in the this specification, is taken to specify the presence of stated features, integers, steps or components but does not preclude the presence or addition of one or more other features, integers, steps, components or groups thereof.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   sending a first position request to a plurality of mobile terminals, the first position request including a current network time and indicating a particular time span for which geographic position information of the mobile terminal is requested,
   receiving, in response to the first position request, first information about a geographic position of each of the plurality of mobile terminals for the particular time span;
   sending a second position request to the plurality of mobile terminals, the second position request including another current network time and a specific time for which geographic position information of the mobile terminal is requested;
   receiving, in response to the second position request, second information about a geographic position of each of the plurality of mobile terminals for the specific time;
   determining a relationship between two of the mobile terminals based on the first information, the second information, the particular time span, and the specific time; and
   automatically suggesting, based on the relationship, an exchange of contact information between the two mobile terminals.

2. The method of claim 1, where determining the relationship between two of the mobile terminals further comprises:
   comparing the first information and the second information from a first of the two mobile terminals with position information from a second of the two mobile terminals.

3. The method of claim 1, where automatically suggesting further comprises:
   sending an exchange request to each of the two mobile terminals;
   receiving an accept response from at least one of the two mobile terminals, the accept response including a timestamp of the most recent contact information from the other of the two mobile terminals; and
   sending a contact information request to at least one of the two mobile terminals.

4. The method of claim 3, where automatically suggesting, further comprises:
   receiving a contact information response from one of the two mobile terminals, the contact information response including contact information with a more recent timestamp than the timestamp of the most recent contact information from the other of the two mobile terminals; and
   sending the contact information from the contact information response to the other of the two mobile terminals.

5. The method of claim 1, where the contact information is an update of contact information previously stored on one of the two mobile terminals.

6. The method of claim 1, where the contact information is not associated with contact information stored on one of the two mobile terminals.

7. The method of claim 1, where the contact information is one of an email address, an instant message address, a phone number, a social networking service identification, or a physical address.

8. A system, comprising:
   a server configured to communicate with a first mobile terminal and a second mobile terminal over a network, the server including a processing unit to:
   send a position request to the first mobile terminal and a second mobile terminal, the position request indicating a particular time span for which to provide geographic position information, receive first geographic position information of each of the first mobile terminal and the second mobile terminal for the particular time span in the position request, send, based on the first geographic position information, another position request to the first mobile terminal and the second mobile terminal, the other position request indicating a specific time for which to provide geographic position information, receive second geographic position information of each of the first mobile terminal and the second mobile terminal for the specific time in the other position request, compare the second geographic position information of the first mobile terminal and the second mobile terminal to determine a relationship between the first mobile terminal and the second mobile terminal, and send a message to the first mobile terminal and the second mobile terminal to suggesting an information exchange of contact information between the first mobile terminal and the second mobile terminal.

9. The system of claim 8, further comprising:
a memory providing temporary working storage to compare the second geographic position information of the first mobile terminal and the second mobile terminal.

10. The system of claim 8, where the processing unit is further configured to:
receive contact information from the first mobile terminal, and
send the contact information from the first mobile terminal to the second mobile terminal.

11. The system of claim 8, where the contact information is one of an email address, an instant message address, a phone number, a social networking service identification, or a physical address.

12. The system of claim 8, where the contact information is not related to contact information stored on the first mobile terminal.

13. The system of claim 8, where the contact information is an update of contact information previously stored on the first mobile terminal.

14. The system of claim 8, further comprising:
a position assist server to assist the first mobile terminal or the second mobile terminal in determining its own position.

15. A method performed by a mobile terminal, comprising:
determining a geographic position of the mobile terminal for a particular time;
storing the geographic position of the mobile terminal for the particular time;
sending, to a server and in response to a request from the server, the geographic position of the mobile terminal for the particular time;
receiving a request to exchange contact information with another mobile terminal based on the geographic position of the mobile terminal for the particular time; and
sending, to the server and based on the request to exchange contact information, an accept response, wherein the accept response includes a timestamp of most recently stored contact information, on the mobile terminal, of an existing contact associated with the other mobile terminal.

16. The method of claim 15, further comprising:
receiving updated contact information of the existing contact stored in the mobile terminal.

17. The method of claim 15, further comprising:
prompting a user of the mobile terminal to accept or reject the request to exchange contact information with the other mobile terminal.

* * * * *